United States Patent
Knubben (10) Patent No.: US 9,604,187 B2
(45) Date of Patent: Mar. 28, 2017

(54) PARTICULATE MATERIAL LOADING DEVICE

(71) Applicant: Mourik International B.V., Botlek-Rotterdam (NL)

(72) Inventor: Petrus Paulus Gerardus Marie Knubben, Leiden (NL)

(73) Assignee: MOURIK INTERNATIONAL B.V., Botlek-Rotterdam (NL)

( * ) Notice: Subject to any disclaimer, the term of this patent is extended or adjusted under 35 U.S.C. 154(b) by 202 days.

(21) Appl. No.: 14/396,103

(22) PCT Filed: Apr. 23, 2013

(86) PCT No.: PCT/EP2013/058405
§ 371 (c)(1),
(2) Date: Oct. 22, 2014

(87) PCT Pub. No.: WO2013/160310
PCT Pub. Date: Oct. 31, 2013

(65) Prior Publication Data
US 2015/0114516 A1 Apr. 30, 2015

Related U.S. Application Data

(60) Provisional application No. 61/638,606, filed on Apr. 26, 2012.

(30) Foreign Application Priority Data

Apr. 23, 2012 (NL) ...................................... 2008686

(51) Int. Cl.
*B01J 8/06* (2006.01)
*B01J 8/00* (2006.01)

(52) U.S. Cl.
CPC ................ *B01J 8/003* (2013.01); *B01J 8/06* (2013.01); *B01J 2208/00752* (2013.01)

(58) Field of Classification Search
CPC . B01J 8/003; B01J 8/0015; B01J 8/004; B01J 8/0035; B01J 8/06; B01J 2208/00752
(Continued)

(56) References Cited

U.S. PATENT DOCUMENTS 2,985,341 A   5/1961   Howell
3,223,490 A   12/1965  Sacken et al.
(Continued)

FOREIGN PATENT DOCUMENTS

CN   101378828 A   3/2009
DE   19934324 A1   9/2000
(Continued)

OTHER PUBLICATIONS

International Search Report of PCT/EP2013/058405 issued on Jul. 10, 2013.

*Primary Examiner* — Nicolas A Arnett
(74) *Attorney, Agent, or Firm* — Ramin Amirsehhi; David Owen; Hoyng Rokh Monegier LLP (57) ABSTRACT

There is provided a loading tray for loading particulate material into an array of substantially vertical tubes; wherein the loading tray comprises a plurality of loading tray elements, each loading tray element comprising at least one loading opening and at least some of the loading tray elements comprising at least two loading openings, the loading tray elements being fitted together to form an array of the loading openings.

25 Claims, 7 Drawing Sheets

(58) Field of Classification Search
USPC ..... 141/1, 12, 71, 73–74, 98, 100, 237, 242, 141/247
See application file for complete search history.

(56) References Cited

U.S. PATENT DOCUMENTS

| | | | |
|---|---|---|---|
| 3,409,411 A | 11/1968 | Mosley et al. | |
| 3,913,806 A | 10/1975 | Red, Jr. | |
| 4,077,530 A | 3/1978 | Fukusen et al. | |
| 4,402,643 A | 9/1983 | Lytton et al. | |
| 4,433,707 A | 2/1984 | Farnham | |
| 4,737,269 A | 4/1988 | Bischoff | |
| 5,114,685 A | 5/1992 | Sapoff et al. | |
| 5,607,893 A | 3/1997 | Diekmann | |
| 5,906,229 A | 5/1999 | Haquet et al. | |
| 6,409,977 B2 | 6/2002 | Harper et al. | |
| 6,905,660 B2* | 6/2005 | Harper | B01J 8/003 141/236 |
| 6,981,422 B1* | 1/2006 | Comardo | B01J 8/06 73/756 |
| 7,836,919 B2* | 11/2010 | Johns | B01J 8/003 141/1 |
| 9,126,166 B2* | 9/2015 | Dupont | B01J 8/004 |
| 9,255,659 B2* | 2/2016 | Cottard | B01J 8/002 |
| 2001/0046463 A1 | 11/2001 | Harper et al. | |
| 2002/0092147 A1* | 7/2002 | Harper | B01J 8/003 422/232 |
| 2004/0191135 A1 | 9/2004 | Johns et al. | |
| 2004/0261898 A1 | 12/2004 | Goemans et al. | |
| 2006/0233631 A1 | 10/2006 | Diehl et al. | |
| 2007/0196253 A1 | 8/2007 | Stocksiefen et al. | |
| 2009/0308138 A1 | 12/2009 | Fischer et al. | |
| 2010/0063304 A1 | 3/2010 | Olbert et al. | |
| 2011/0083769 A1 | 4/2011 | Sanz et al. | |
| 2014/0290788 A1* | 10/2014 | Dupont | B01J 8/004 141/1 |
| 2015/0107717 A1* | 4/2015 | Knubben | B01J 8/06 |

FOREIGN PATENT DOCUMENTS

| | | |
|---|---|---|
| EP | 0963785 A1 | 12/1999 |
| EP | 2314371 A1 | 4/2011 |
| GB | 1335034 A | 10/1973 |
| GB | 1417464 A | 12/1975 |
| GB | 2186209 A | 8/1987 |
| NL | 7207472 A | 12/1973 |
| WO | 98/14392 A1 | 4/1998 |
| WO | 2004/085051 A | 10/2004 |
| WO | 2006/104832 A2 | 10/2006 |
| WO | 2007/041254 A2 | 4/2007 |
| WO | 2010/068094 A2 | 6/2010 |

\* cited by examiner

PARTICULATE MATERIAL LOADING DEVICE

BACKGROUND OF THE INVENTION

1. Field of the Invention

The invention relates generally to a loading tray for loading particulate material into an array of tubes. More particularly the invention relates to catalyst loading tray for loading particulate catalyst into reactor tubes of catalyst reactors. In other aspects, the invention relates to a loading tray element for assembly into a loading tray; and a method of loading particulate catalyst into a catalytic reactor using a catalyst loading tray. In particular the invention relates to a device and method for loading catalyst pellets into catalytic reactor vessels having a plurality of vertically aligned, parallel reaction tubes.

2. Description of the Related Art

Chemicals are often manufactured on an industrial scale by reaction in large industrial catalytic reactors. A type of industrial catalytic reactor often used is provided with a multitude of vertically arranged, parallel reaction tubes partially or fully filled with catalyst particles during operation. Chemical reactants are passed through the reaction tubes to contact the catalyst for reaction. Such reactors are often referred to as multi-tube reactors. These types of reactors are known and are described in patent publications GB3,223,490 and U.S. Pat. No. 6,409,977.

Typical catalytic reactors are cylindrical with a diameter in the region of 2 to 9 metres and a height in the region of 5 to 50 metres. Catalytic reactors are usually bespoke structures designed for particular chemical processes or site requirements and hence individual reactors can vary greatly in their dimensions. In principle, such a reactor can be of any size, and in particular can be bigger or smaller than the typical sizes given above, the limitations being associated with physical construction limits and reaction requirements. There has been a general trend in the last years, particularly in the petrochemical industry, to increase catalytic reactor sizes.

The reactor is normally provided with a cylindrical shell containing a large number of vertically aligned, parallel reaction tubes; anywhere from 500 to 40,000. The reaction tubes have upper and lower ends that are joined e.g. welded, to openings in upper and lower tube sheets. The tube sheets extend horizontally in the cylindrical shell and are normally located adjacent end flanges thereof. The upper and lower ends of the reactor shell are closed off by domes that can be opened to permit internal access for servicing and catalyst replacement in the reaction tubes. For example, the domes may be provided with manholes to allow worker access or may be removable. Oftentimes domes are non-removable, or at least not conveniently removable, because cooling pipes are run through the dome into the reactor core. These cooling pipes can make it complicated or impossible to remove the dome of the reactor.

The reaction tubes are open at their ends and can have inner diameters from in the region of about 2 to 15 cm. They are joined (e.g. by welding), to a pattern of openings provided in the tube sheets. The number of tubes and pattern of openings in the tube sheets is appropriate to the chemical reaction and scale of reaction that is carried out in the reactor, but normally the openings are equally spaced with a, preferably constant, pitch (i.e. the shortest distance between the outer periphery of one hole and the outer periphery of its neighbour hole) of from 0.3 to 5 cm or more.

Catalyst particles are loaded into the reaction tubes. Catalyst particles are provided in a variety of sizes and shapes, typically spherical or cylindrical, and have nominal diameters in the range of from about 1 mm to 25 mm, more normally in the range of 2 to 1.5 mm. The reaction tubes and catalyst pellets are matched in size to allow for the particles to enter the reaction tubes in a controlled manner that minimizes bridging risks. Typically the particles have a maximum dimension of from 0.1 to 0.8 times the reaction tube inner diameter, more normally from 0.15 to 0.6, and more normally 0.25 to 0.4.

Careful loading of the catalyst particles into the reaction tubes is essential to ensure that the catalyst reaction proceeds as desired. In particular, it is necessary to: achieve the correct loading density of particles within a reaction tube; to make sure that each of the reaction tubes has a similar pack density within a tolerance range; to avoid bridging, i.e. void formation when two or more particles wedge against one another in the tube forming a false base; to provide filling of the catalyst to the correct level in the reaction tube i.e. allowing sufficient tube outage when needed; to avoid as far as possible dust entry into the reaction tubes; and to avoid crushing and/or attrition of catalyst particles by harsh filling practices. When loading catalyst into the reaction tubes it is best to limit the loading orifice so that catalyst particles enter one by one, predominantly because this reduces the risk of bridging.

Bearing these requirements in mind, loading of catalyst into a large number of reaction tubes in a catalytic reactor is both time consuming and arduous. This leads to excessive down-time of expensive reactor plants, and also to possible errors in filling, leading to poor quality reactions and products.

A conventionally used loading method is template loading. In such a method a large custom template is provided. The template forms a grid of holes with spacing that matches the layout of the reactor tube ends in the tubesheet. The template is laid over the tubesheet of the reactor. Catalyst is poured onto the template and is loaded into the reactor tube ends by up to four persons sweeping the catalyst over the template.

It has been attempted in the prior art to accelerate the filling of catalyst into catalytic reactors by provision of filling aids.

WO98/14392 and U.S. Pat. No. 4,402,643 discuss reaction tube charging systems. The systems take the form of wheeled loading carts with multiple catalyst charging tubes for simultaneous insertion into a multitude of reaction tubes. The carts can be wheeled over the tube sheets.

U.S. Pat. No. 3,913,806 discusses a catalyst loader for simultaneous loading of catalyst particles into multiple tubes. The catalyst loader takes the form of a movable support frame including a number of tubular members which hold a predetermined quantity of catalyst material for deposit into the reaction tubes. The frame is used to fill a number of reaction tubes and is then moved to another set of empty reaction tubes to fill those tubes.

U.S. Pat. Nos. 3,223,490 and 2,985,341 discuss catalytic reactor loaders in the form of templates that sit atop the tubesheet. In U.S. Pat. No. 2,958,341, the template is aligned with the openings in the tubesheet and catalyst particles are poured onto the template from where they are vibrated into the openings and into the reaction tubes. WO2010/068094 discusses a loading device having a plate with a pattern or loading holes provided with a sieving means between the loading holes. The device covers an array of reaction tube openings while providing for dust removal.

U.S. Pat. No. 5,906,229 discusses a catalyst loader that fills multiple tubes at one time by allowing catalyst particles to rain down over the reaction tube openings.

EP0963785 discusses reactor tube inserts with polygonal heads that make up a loading surface with regular gapping between the insert heads. The gapping forms a recess for collecting dust when catalyst particles are swept over the inserts.

WO2010/068094 discusses a recent development in catalyst loading takes the form a parallelogram template with an array of in the region of 96 holes surrounded by an upstanding wall. The template is placed over a region of tubesheet fitted with filler sleeves. The loader template is then reciprocally shifted parallel to the tubesheet while catalyst particles are poured on. The reciprocal shifting provides for a sweeping of the particles into the reaction tubes. Such a device is known from Mourik International BV, Netherlands as The Shuffle Loader™. An advantage of this device is that it offers benefits of template loading while usable in almost any catalytic reactor having appropriate tube spacing (pitch) on the tubesheet.

Another problem that exists with conventional loading processes is found in the release and generation of catalyst dust and fines. Although catalyst material is typically sieved to remove dust at the point of manufacture or dispatch, not all dust can be removed and new dust and fines is unavoidably generated due to particle attrition during transport and loading.

Dust and fines are a problem because they can pollute the working environment for personnel; they can adversely affect the catalytic reaction in the vessel by increasing density of packing and by blocking reactant flow; and they can pollute reaction product.

Attempts have been made in the prior art to reduce the problem of dust and fines.

In WO2006/104832, US2006/0233631 and U.S. Pat. No. 4,077,530 for example, insertion of velocity reducing devices to the reaction tubes has been proposed so as to slow particles as they fall in the tubes.

U.S. Pat. No. 4,737,269 discusses a catalyst loading hopper provided with a dust outlet at the top of the hopper, which may be connected to a conduit so as to draw dust away from the upper end of the hopper and a screen at the bottom of the hopper to separate the catalyst from any fine or undersized catalyst particles. This apparatus can capture some of the dust generated due to attrition during transportation but improvement is desirable. In addition the apparatus does not address the matter of dust generated during loading of catalyst particles into the reaction tubes, by e.g. sweeping or vibration of the particles.

U.S. Pat. No. 3,409,411 discusses a method of separating fines from particulate catalyst during loading, by application of a vacuum. The catalytic reactor addressed is a flat-bed reactor that is loaded with a single hose, not with a catalyst loading template.

There remains a need for improved filling practices and filling apparatuses.

THE INVENTION

According to the present invention there is provided a loading tray for loading particulate material into an array of substantially vertical tubes; wherein the loading tray comprises a plurality of loading tray elements, each loading tray element comprising at least one loading opening, and at least some of the loading tray elements comprising at least two loading openings, the loading tray elements being fitted together to form an array of loading openings.

When assembled into a loading tray, the loading tray elements are disposed adjacent one another to form a loading template with an extended array of loading holes. The loading tray elements preferably closely abut one another leaving little to no space between their adjacent sides.

In one aspect the invention takes the form of a catalyst loading tray for loading catalyst pellets into a catalytic reactor comprising an array of substantially vertical reaction tubes; wherein the loading tray is modular comprising a plurality of loading tray modules, each loading tray module comprising two or more loading openings, the loading tray modules being fitted together to form a template of loading openings.

Conventional catalyst loading templates are reactor specific in dimension so that they can be used only with the catalytic reactor for which they have been designed. These conventional templates require labour intensive filling by personnel sweeping catalyst particles over the template.

This labour intensive filling by personnel has been somewhat addressed by the prior art by use of filling aids. Such filling aids are more expensive and bulky than simple templates and the question of cost and space becomes an issue in providing reactor specific filling aids. Hence it has been attempted to create catalyst loaders that can be applied to a variety of catalytic reactors. For example, parallelogram reciprocal shifting loaders are much smaller than the typical tubesheet and so can be applied to different tube sheets. Although they are very useful in obtaining good catalyst loading, they are limited in their application because they cannot reach all the reaction tubes of a catalytic reactor, for example those at the circular periphery a cylindrical catalytic reactor, or those located adjacent to or inline with upstanding tubesheet supports or coolant tubes. This is particularly a problem since the radius, and hence outer curve, varies between catalytic reactors. In addition the location of supports and coolant tubes are non-standard. Reaction tubes that are not filled by use of the filling aids must be filled by hand with consequent increases in labour requirements, down-time and risks of inhomogeneous packing across the reaction tubes.

The present invention provides a loading tray that is constructed from loading tray elements or modules. The loading tray can be conveniently constructed from the loading elements in situ above the tubesheet so that a temporary bespoke loading template providing an array of loading holes can be assembled in place. The loading tray elements from which the loading tray is constructed comprise a variety of loading tray element sizes so that different loading tray forms can be constructed to fit the form of a particular tubesheet and tube array. For example, the loading tray can be so assembled that it follows the form of the outer inner peripheral radius of the tubesheet or so that it includes spaces where it is assembled around fixed cooling tubes etc.

This makes the filling aid more versatile since it can be used for filling a variety of catalytic reactors. The advantage is particularly keenly felt since a specialist catalyst loading operator is able to replenish catalyst in a range of catalytic reactors using only a single modular loading tray system and does not need to provide reactor specific templates or to use templates belonging to the reactor owner requiring specific training.

In other known techniques, single filler sleeves are provided that can be inserted one by one and removed one by one from the reactor tubes. This is time consuming and arduous.

Preferably the catalyst loading tray elements are releasably joined to each other to form the array of catalyst loading holes. Releasable joining of the loading tray elements provides a planar surface onto which catalyst pellets can be poured. Preferably the joining results in substantially little to no gaps between the loading tray elements into which catalyst pellets and/or dust can fall.

The loading tray modules are preferably joined to adjacent modules in the planar array by way of releasable mechanical fastenings. The loading tray elements are preferably joined so as to lock horizontal movement so that substantial horizontal shifting is prevented or reduced during filling practices.

It is possible that the fastenings are vertically lockable in at least one direction. This allows for the loading tray module to form a self supporting elementary catalyst loading tray that can be lifted as a single element. In this respect the fastenings can provide both vertical and horizontal fixation of the loading tray modules.

Alternatively, the loading tray elements are joined together only horizontally so that substantial horizontal shifting is prevented but vertical movement is not prevented. This provides a unitary loading tray while it is resting upon or above the tubesheet but allows each loading tray element to be removed from the loading tray assembly by simple lifting of that single element. Individual lifting of each tray element can be advantageous to reduce weight for manual lifting. Manual lifting may be necessary when space restraints in the dome mean lifting machines cannot be used.

In a preferred realisation of the catalyst loading tray, the loading tray modules are releasably fastened into the array by way of slot connectors, preferably T-slot, L-slot or dove joint fastenings. It will be evident to the skilled person that slots and inserts can be provided on modular items in various configurations, however, it is considered practical to provide each loading tray module with a slotted side and a proud side. The slot connectors are preferably arranged for substantially vertical insertion and removal since this allows for ease of adjoinment.

Each of the loading elements is preferably provided with at least 2, preferably at least 3, more preferably at least 4, and most preferably at least 5 loading openings. Preferably each of the loading elements has less than 40 loading openings, preferably less than 30 loading openings, and more preferably less than 20 loading openings.

It is generally desirable to provided the loading tray modules with the maximum number of loading openings that dimensions and weight practically allow. A maximum number of loading openings offers a maximum template coverage meaning fewer construction steps are needed to attain the completed loading tray. This is of course in balance with the need for flexibility in modular shape construction to fit various catalytic reactors and weight of the loading tray elements.

The preferred form of the loading elements is longitudinal with the loading holes provided in a single linear configuration. A strip of loading holes provides an easy construction of longitudinal loading elements fitted together along their long edges. The loading holes are linear in configuration since this is the typical layout of reaction tubes in a reactor and allows easy construction with a good deal of flexibility in form construction. Square, rectangular with two or more rows of loading holes, and triangular loading elements with square, rectangular or triangular arrays of loading holes could be considered for inclusion in the loading tray in order to cover larger areas of reaction tubes as a time saving tool.

The mating edges of the loading tray elements can be long straight edges which closely abut with one another to leave little to no gap for dust or particles to fall between the elements along their abutting edges. Conveniently the abutting edges are substantially straight, however, waved or jagged mating interfaces can also be used.

Configurations of loading holes other than linear are less preferred but could be appropriate where application of the loading tray to a more unconventional tube array layout is desired.

As discussed above, the catalyst loading tray can be constructed from a variety of sizes and or shapes of loading tray modules. For example, when constructing a loading tray to closely fit the curved inner edge of a reactor it could be desirable to construct the loading tray from loading tray modules with a progressive reduction in length and/or number of loading holes per loading tray element as the loading tray runs into the curved wall of the catalytic reactor.

Alternatively, when avoiding a coolant tube or support upstanding from the tubesheet, a matrix of longer loading tray modules may be interrupted by one or more shorter loading tray modules in order to create a void in the catalyst loading tray where the support or coolant tube can pass through.

In this respect it is advantageous to have a kit of loading tray elements of various lengths, widths and/or shapes, that can be constructed into a variety forms to match the layout of a particular tubesheet and reactor.

In a preferred form the loading tray is provided with one or more upstanding sidewalls at or beyond a periphery of its array of loading openings. This wall forms a tray in which the particles can be poured. The walls hold the particulate material on the filling area preventing its escape to tubes that are not currently being filled, in particular the sidewalls have a sufficient height to prevent escape of catalyst when loading vibration is applied to the loading tray.

The upstanding side walls preferably comprise releasably attached sidewall elements. The sidewall elements are preferably attached by way of the same or similar releasable fastening mechanism as discussed above for affixing the loading tray modules together.

In an advantageous embodiment the loading openings are adapted in form to receive and hold filler sleeves that insert via the loading openings into the reaction tubes. Catalyst filler sleeves are known generally and offer a simple manner to achieve a desired outage in the reaction tubes by creating a temporarily restricted volume in the upper part of the reaction tubes during filling. Such tubes are known from, e.g. WO2004/085051.

A filler sleeve comprises an upper portion having a loading orifice and a support engagement member, and a tubular sleeve extending downwardly from the upper portion so that the catalyst loading opening leads to an interior of the tubular sleeve. The support engagement member is preferably a flange. The flange engages the periphery of a loading opening and rests thereon. Preferably a seat is provided at the edge of the loading opening on which the upper flange comes to rest. Most preferably the seat has a depth that matches the thickness of the upper flange so that when seated the upper flange is flush with the particle receiving surface of the loading tray element. This provides a flat particle receiving surface for the loading tray and helps to avoid riding up of the filler sleeve which could interfere with filling processes.

The loading orifice of the filler sleeve allows particles to enter and therefore preferably has a diameter at least 1.1 times the greatest dimension of the particle to be loaded, preferably 1.2 times. The loading orifice size is preferably limited to restrict the passage of particles to one or two particles at a time. When allowing only one by one entry of particles preferably the orifice diameter is less than 2 times the greatest dimension of the particle to be loaded. When allowing two particles at a time only the diameter is preferably less than 3 times the greatest dimension of the particle. This helps to avoid bridging.

It is preferred that the filler sleeves are vertically supported within the loading openings of the constructed loading tray because they can then be vertically removed from the reaction tubes together with the loading tray or loading tray elements when these are raised. Advantageously this allows a single removal step of both loading tray element and filler sleeve avoiding the time consuming need to remove each filler sleeve individually, as was the case in prior filler devices. The filler sleeves are preferably removably insertable into the loading openings.

A further advantage associated with the provision of filler sleeves in the loading openings is that because the filler sleeves pass into the tubes of the array they aid in locking the loading tray in the correct position above tube array, preventing horizontal shifting of the tray when, for example, vibration is applied.

To aid in loading the catalyst particles into the catalyst loading openings, and to also preferably overcome the need for manual sweeping, at least a part of the loading tray is preferably subjected to vibration to agitate the catalyst particles so that they spill into the loading openings.

Preferably a vibrator is provided on one, more or most preferably each of the loading tray modules. The vibrator subjects the loading element to vibration and jossles or agitates the particles into the loading openings. The provision of a vibrator on each or the majority of the loading tray elements gives a even distribution of vibration across to assembled loading tray without the need for application of excessively powerful vibration from a single point.

During loading of particulate catalyst material the presence of catalyst dust can be problematic. The dust originates in the catalyst material as delivered but can also be generated due to attrition during loading processes. This dust if it enters into the reaction tubes can negatively influence the catalysed reaction and can pollute the product of the chemical reaction. It is known to remove dust during loading processes by application of a vacuum, however, improvement is desirable. Dust differs from the particulate materials or pellets that are being loaded in terms of size. As mentioned previously, particles for loading are generally in the size range of 1 mm to 25 mm nominal diameter. Dust on the other hand is considered to comprise components in the range of 100 micron or less.

According to a preferred embodiment of the invention the loading tray further comprises one more supports for spacing the assembled loading template above the tubesheet to form a volume between the assembled loading template and the upper tubesheet; and a vacuum outlet for application of a vacuum to the volume between the loading template and the upper tubesheet when the loading template is in place for use.

Application of a vacuum to the volume immediately prior to the catalyst particles entering the reaction tubes removes dust and fines present in the catalyst material at the final stage of filling, thus reducing the amount of further dust and fines that can be created downstream of a dust removal step.

In this respect at least some, preferably a majority or more preferably substantially all of the loading tray elements of the loading tray comprise one or more supports for spacing a template element above the tubesheet to form a volume under the template element; and a vacuum outlet for application of suction to the volume under the template element.

The volume between the tubesheet and loading template elements is substantially closed in order to achieve a good airflow over and through the stream of particles as they pass through the volume when falling into the tubes. Thus when assembled into the extended loading tray a series of substantially distinct chambers is provided under the loading tray elements, each volume provided with its own at least one vacuum outlet. A thorough application of suction for dust removal can thus be applied to substantially the whole of the assembled loading tray. Since the loading tray elements are preferably linear, a plurality of distinct elongate chambers is provided, each chamber being provided with a vacuum outlet, and this allows for efficient airflow to the vacuum outlets.

When the loading openings are disposed in a single row a well controlled airflow is achieved when a vacuum outlet is provided at a short end thereof.

It is preferable that a vacuum outlet is provided for at least every 40, more preferably for at least every 30 and most preferably for at least every 20 loading openings. This ensures an adequate air flow under the loading openings and hence dust and fines capture. In this manner loading assembled templates of for example 300 or more, 400 or more, or 500 or more loading openings can be implemented.

In a preferred embodiment of the invention a channel is provided extending between the underside of the catalyst loading openings of the template and the upper side of the reaction tube openings, the channel having side sieve openings that are sized to block passage of catalyst particles but that allow passage of dust and fines, which can be captured by the vacuum. The sieve openings are preferably sized to prevent passage of a particle having at least one dimension at least about 0.2 of an upper, inner diameter of the channel. The sieve openings can be in the form of slot openings, circular openings forming a grid of openings to allow airflow, or could be openings in a gauze or wire mesh.

The vacuum sieving can beneficially be combined with use of a specially adapted filler sleeve, the filler sleeve comprising an upper portion having a catalyst loading orifice and an loading template engagement member; a tubular sleeve extending downwardly from said upper portion so that the catalyst loading orifice leads to an interior of the tubular sleeve; wherein the tubular sleeve is provide with side sieve openings sized to prevent passage of particulate catalyst but to allow passage of dust. In this way the filler sleeve forms the sieve channel between the catalyst loading hole and the reaction tube opening.

It is preferred that the sieve openings are disposed to be at least partially located within the upper ¼ of the length of the tubular sleeve, preferably the upper ⅛.

An alternative to filler tubes, where such are not required for obtaining outage in the reaction tubes, are short sieve tubes that form a channel limited to between the catalyst loading openings and the reaction tube openings, the sieve tubes having sieve openings as discussed above in their sidewall(s).

The sieve openings are most effective for dust removal when they are at least partially located within the volume between the loading template and the upper tubesheet, since this is where the vacuum is strongest. Preferably the sieve holes are only present within that volume. The sieve openings are also preferably simple apertures and are not provided with valves, closings or such.

In a preferred embodiment an air-flow deflector may be provided in front of the vacuum outlet to reduce suction applied to the channel(s) closest to the vacuum outlet while ensuring adequate air flow at channels further removed from the vacuum outlet. In one realisation the deflector may be a semi-circular wall with its concave side facing the channel or filler sleeve closest the vacuum outlet.

According to another aspect of the present invention, the filler sleeves located within the catalyst loading openings are provided at their upper region with sieve apertures sized to retain catalyst particles within the filler sleeve but which allow the passage of dust and fragmented particles. By application of a vacuum external of the filler sleeve and adjacent the sieve apertures, much of the dust and fragmented particle material is removed from the catalyst particles as they are fall into the reaction tube.

This feature is particularly advantageously embodied in combination with the loading elements of this invention wherein each of the loading elements is provided with a substantially closed volume around the upper region of the filler sleeves, and a vacuum outlet is provided to allow application of a vacuum to the substantially closed region. Since the modules encompass is smaller area than that of a full conventional template, an effective air flow for the area can be better achieved. This is especially the case when the template module is linear.

Since each of the template modules is provided with its own vacuum outlet, the whole area of the constructed template array can be subjected to a dust removing vacuum without the need for an expensive custom made template usable in only one reactor.

In another aspect of the invention there is a provided a method of filling an array of substantially vertical reaction tubes with a particulate material, comprising the steps of: disposing a loading tray as discussed herein, above the tubes so that the loading openings align with the openings of the tubes; supplying the particulate material to the array of the loading openings such that the particulate material passes through the loading openings and the tube openings; and removing the loading tray from the tube array.

The method is preferably used to fill a catalytic reactor comprising an array of substantially vertical reaction tubes with a particulate catalyst. More preferably the method also involves the step of inserting filler sleeves into at least some of the loading openings prior to the filling step, and even more preferably of removing the inserted filler sleeves from the loading openings after filling.

The loading tray can be constructed or partially constructed prior to disposal atop the tubesheet, but also can be constructed or partially constructed in situ from the loading elements.

In a preferred embodiment the method comprises the steps of:
  a. disposing a catalyst loading tray with vacuum outlets as discussed, above the reaction tubes of the catalytic reactor so that the catalyst loading openings align with openings of the reaction tubes;
  b. supplying the particulate catalyst material to the array of the catalyst loading openings such that the particulate catalyst material passes through the catalyst loading openings and the reactor tube openings;
  c. applying a vacuum via the vacuum outlet for at least part of the duration of step b, preferably for the substantial duration of step b, and more preferably also prior to and/or subsequent to step b; and
  d. removing the catalyst loading tray from the catalytic reactor.

According to a further aspect of the current invention there is provided a kit of parts comprising a plurality of loading tray elements as described above, the loading tray elements having a variety of sizes. By providing a kit of parts having a variety of loading tray element sizes (i.e. loading tray elements having different numbers of loading openings) a bespoke loading tray matching the form of a particular tube array can be assembled. Such a kit of parts could comprise loading tray elements having from 1 loading opening up to 40 (or more) loading openings and all integers inbetween. For example a kit of parts might comprise a plurality of loading tray elements having 20 loading openings, a plurality of elements having 10 loading openings, a plurality of elements having 5 loading openings, a plurality of elements having 4 loading openings, a plurality of elements having 3 loading openings, a plurality of elements having 2 loading openings and a plurality of elements having 1 loading opening.

Preferably the kit of parts is also provided with a plurality of filler sleeves insertable within the loading openings of the loading tray elements.

More preferably the kit of parts is also provided with a plurality of sidewall elements releasably attachable to the loading tray elements.

Although primarily directed to the loading of catalyst particles into catalyst reactors, the device and method of the present invention may also lend themselves to the loading of generally any particulate flowable material in which a loading template is used. An example of such a use would be the loading of grain into a silo, the sorting of stone or gravel

BRIEF DESCRIPTION OF THE DRAWINGS

The features and advantages of the invention will be further appreciated upon reference to the following drawings, presented by way of example only, in which.

DESCRIPTION OF ILLUSTRATIVE EMBODIMENTS

Figure 1:
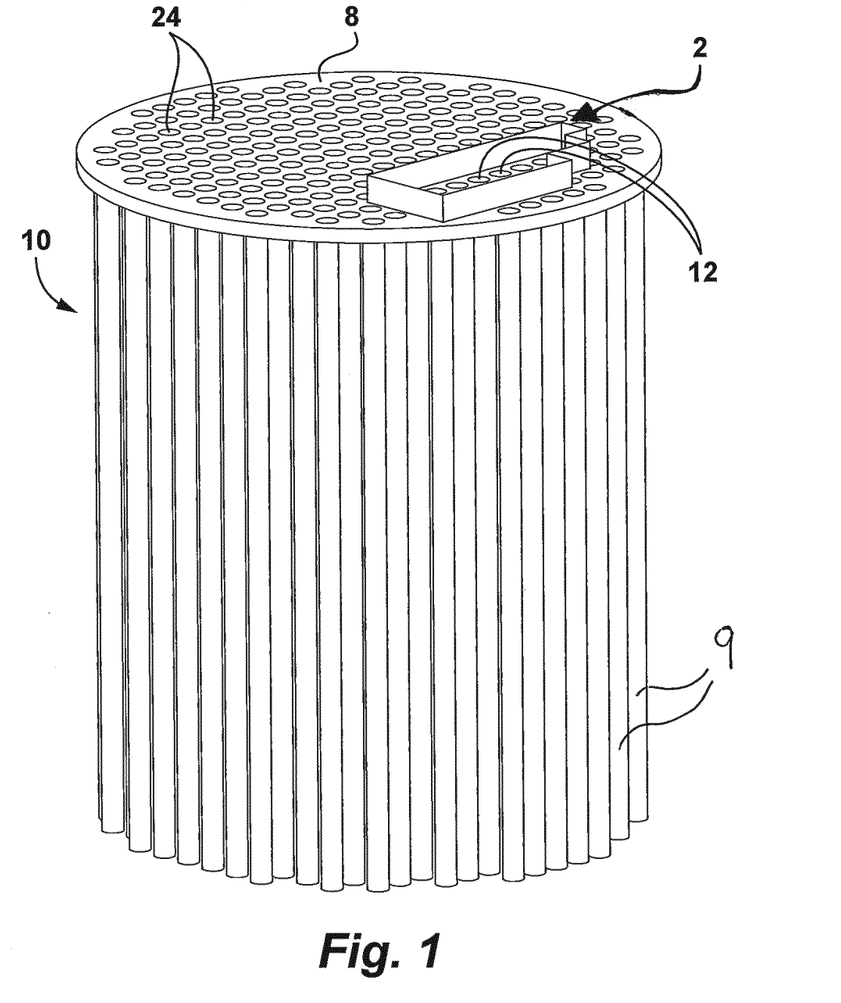
FIG. 1 is a partial perspective view of a catalytic reactor (sidewall not shown) having a loading tray disposed on its tubesheet.

FIG. 1 shows a partial view of a catalytic reactor 10 provided with an upper tubesheet 8 having an array of reaction tube openings 24. Each reaction tube opening 24 leads to a reaction tube 9 extending downwardly from the tubesheet within the catalytic reactor 10. The catalytic reactor 10 is normally provided with an enclosing sidewall and a lower tubesheet to form an enclosed space for, for example, coolant. For ease of explanation the sidewall and lower tubesheet are not shown in the figures.

A loading tray 2 is provided on top of the tubesheet 8 to aid insertion of particulate catalyst material via the reaction tube openings 24 into the reaction tubes 9. The loading tray 2 forms a trough into which particulate catalyst can be poured from, for example, a hopper. The loading tray 2 itself is provided with an array of loading openings 12 which are aligned with the reaction tube openings 24 of the tubesheet 8. In use catalyst particles pass via the loading openings 12 through the reaction tube openings 24 and are loaded into the reaction tubes 9.

Figure 2A:
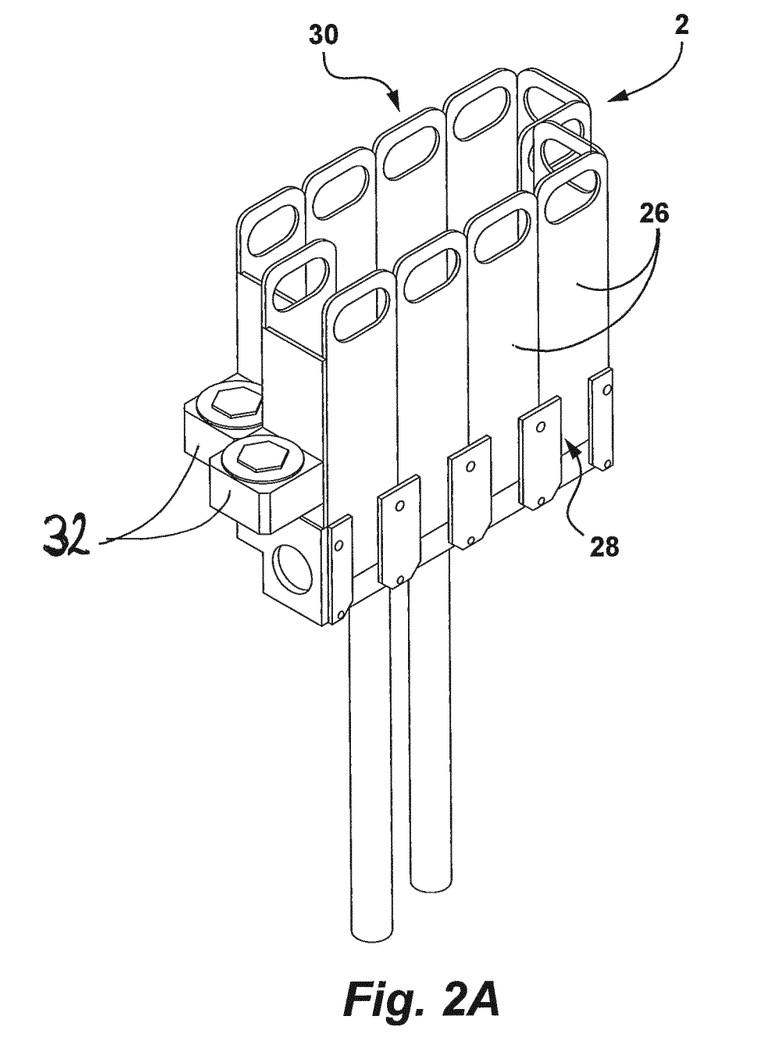
FIG. 2A is a perspective view of a loading tray provided with an upstanding peripheral wall.
Figure 3:
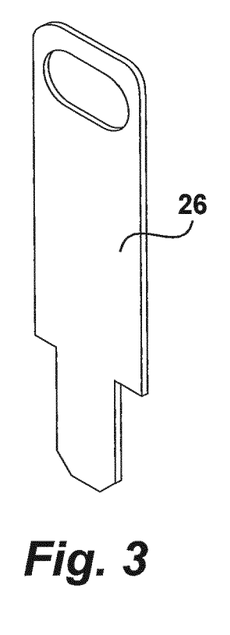
FIG. 3 is a perspective view of a peripheral wall element.

FIG. 2A shows a more detailed perspective view of a loading tray 2. The loading tray 2 is provided with removable, upstanding sidewall elements 26. These sidewall elements 26 form an upstanding peripheral sidewall 30 of the trough into which particulate catalyst can be poured. The sidewall elements 26 are removably fitted to the loading tray 2 by vertical insertion into T-slots 28. A clearer view of a removed sidewall element 26 is found in FIG. 3. The illustrated sidewall element 26 is appropriate to fit a single T-slot 28 only, and the upstanding peripheral sidewall 30 of FIG. 2A is made up of twelve such elements adjacent one another. In some circumstances it may be advantageous to provide sidewall elements 26 that fit more than one T-slot 28 at a time, so that at least one side of the upstanding peripheral sidewall 30 can be formed of a single element 26. For example the four sidewall elements 26 of the closest side of the loading tray in FIG. 2A could be replaced by a single element 26 fitting into the four slots 28.

Figure 2B:
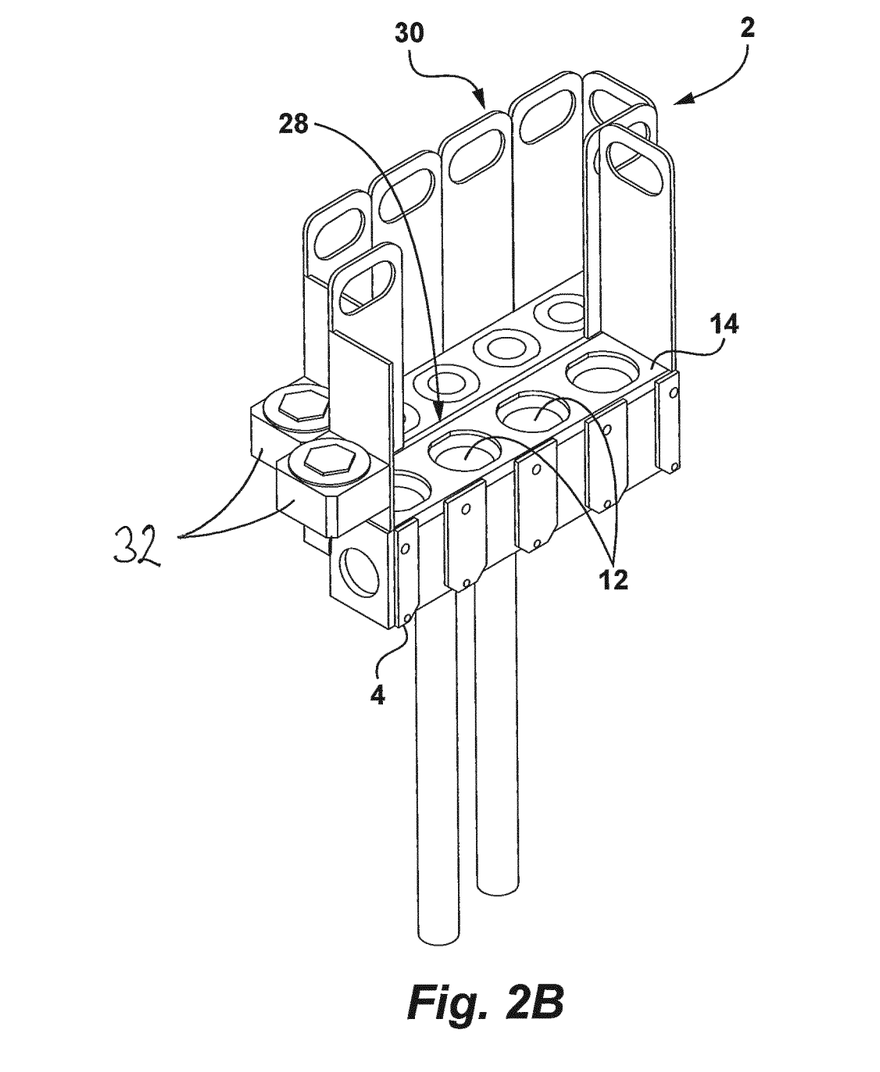
FIG. 2B is a perspective view of the loading tray of FIG. 2A with a part of the peripheral wall removed.

FIG. 2B shows the loading tray 2 of FIG. 2A with the closest of the sidewalls 30 removed to reveal a loading template 14 comprising an array of loading openings 12.

As can be seen, the loading tray 2 is constructed from two elongate loading tray elements 4 joined to one another along one of their long sides. Each of the shown loading elements is provided with four loading openings 12. By joining the two loading tray elements 4 together an extended planar array of eight loading openings 12 is formed allowing particulate catalyst to be loaded into more reactor tubes at once. Naturally, loading tray elements containing more than four or less than four loading openings can be provided.

The loading tray elements 4 are releasably joined together by a T-slot mechanism 28 that allows the modules 4 to be vertically slid into and out of engagement. It will be clear to those skilled in the art that other forms of releasable fixation of the modules can be used such as L-slots, dove-tail joins and magnetic attachments.

Although in FIGS. 2A and 2B only two catalyst loading tray modules 2 are shown slotted together, extended loading trays having arrays of many more loading openings 12 can be constructed by modular construction of a greater number of loading tray elements 4 than that shown. Loading tray assemblies with arrays of from about 50, 80, 100, 300 or more catalyst loading openings 12 are particularly practical for a speedy and efficient loading of catalyst into a catalytic reactor.

The loading tray elements 4 can also be assembled into a variety of loading tray shapes by, for example off-setting adjacent modules 4 from one another, as is shown in FIGS. 2A and 2B. In this manner different layouts of loading tray 2 can be assembled to fit a variety of dimensions of catalytic reactor tubesheets, for example to match a particular tube array pattern following an inner radius of a reactor or to be fitted around cooling pipes passing through a tubesheet. Practically, this feature allows catalyst loading trays 2 to be constructed that can fit the outer radii of specific catalytic reactors, without the need for a bespoke template or manual filling of reaction tubes missed by a 'one fits all' type catalyst loader.

It is a particularly useful aspect of the loading tray 2 that it can be assembled from a kit of parts containing a variety of loading tray elements 4 of different sizes, i.e. having different numbers of loading openings 12. Since the loading openings within the loading tray elements of a particular kit will have the same pitch, elements having more loading openings 12 will be larger, and preferably longer when the loading openings 12 are laid out in a single line. By providing a variety of loading tray element sizes in a kit the possible catalyst loading tray forms that can be constructed from the elements 4 is further extended.

A kit of parts might comprise 25 or more loading tray elements having 20 loading openings, 15 or more elements having 10 loading openings, 10 or more elements having 5 loading openings, 5 or more elements having 4 loading openings, 5 or more elements having 3 loading openings, 5 or more elements having two loading openings and 5 or more elements having 1 loading opening.

The loading tray elements 4 and sidewall elements 26 can be formed from a variety of materials which the skilled person will be able to select based on the particular application of the loading tray 2. In the case of catalyst loading, it is important that the material of the loading tray is inert with respect to the catalyst in order to avoid chemical attack of the loading tray or chemical changes to the catalyst. Preferred construction materials are stainless steel and aluminium. For the joining mechanism, e.g. the T-slot mechanism shown in the figures, plastics allowing easy vertical sliding with some flexibility, can be used. For example, polypropylene and polyvinyl chloride plastics can be used.

Figure 4:
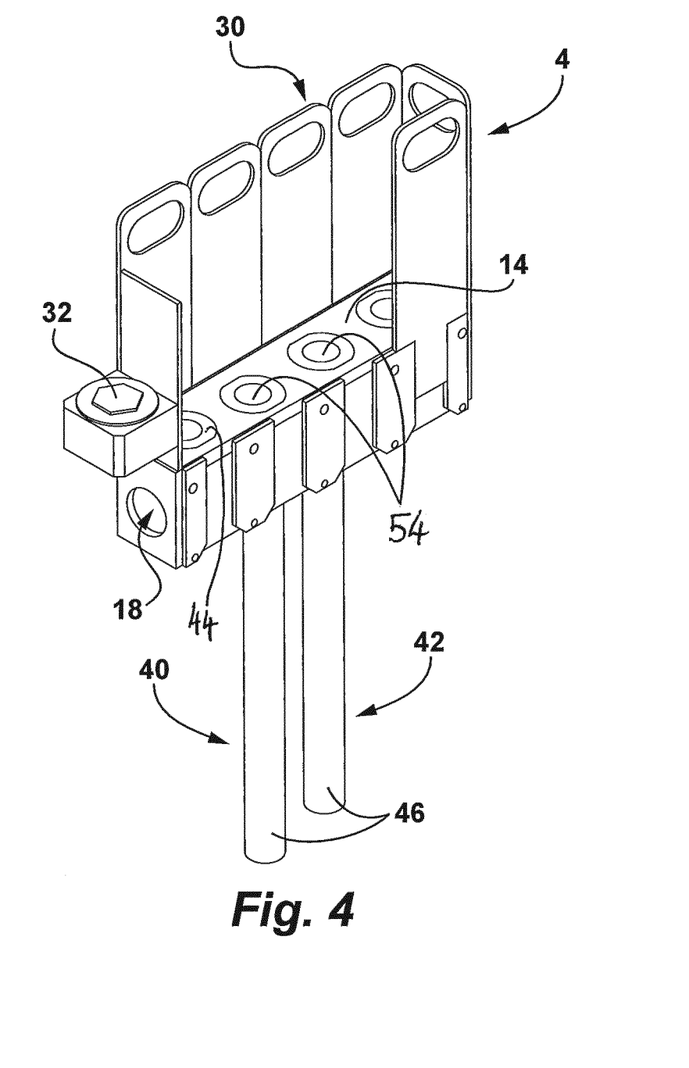
FIG. 4 is a perspective view of a single loading tray element.

Turning now to FIG. 4, a single loading element 4 of the type seen in FIGS. 2A and 2B is shown. As shown, two filler sleeves 40 and 42 are provided. A filler sleeve is a tool used for loading catalyst into a reactor tube. The filler sleeves 40, 42 have upper flanges 44 that are seated in the loading openings 12 of the loading template 14 and define loading orifices 54 having a diameter smaller than the diameter of the loading openings 12. The filler sleeves 40, 42 are provided with downwardly extending sleeves 46 that penetrate into the reaction tubes of the catalytic reactor. Filler tubes are generally known in the art of catalyst loading and are used to provide a controlled level of outage in the loaded reactor tubes. Since the volume inside a filler sleeve is less than the volume of the surrounding portion of the reactor tube 12, when it is removed after being filled it deposits a limited amount of catalyst particles into the top of the reactor tube, which limited amount then sinks to fill the larger volume of the reactor tube. The result is a controlled outage in the reaction tube. When in use all or only some of the catalyst loading openings 12 are provided with filler sleeves 40, 42. In some cases one or more of the catalyst loading holes 12 may be blocked with a plug (not shown) if it is not required that catalyst be added at a particular location.

Figure 5:
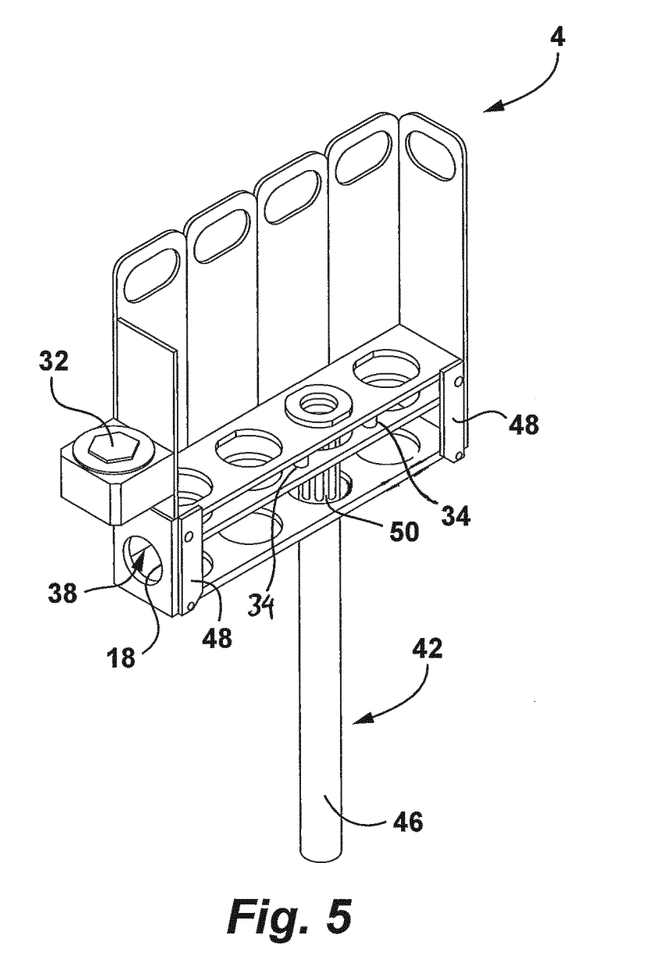
FIG. 5 is a perspective view of the catalyst loading tray element of FIG. 4 with a sidewall removed.

As can be seen in FIG. 5 the catalyst loading template 14 is held in a raised position above the tubesheet 8 by way of supports 48 to create a volume 38 between the catalyst loading template 14 and the tubesheet 2. In FIG. 4, and in use, this volume is substantially closed off except for a vacuum outlet 18 to which a pump (not shown) can be connected to apply a vacuum to the volume 38; the catalyst loading openings 12 and the reaction tube openings 8.

Figure 6:
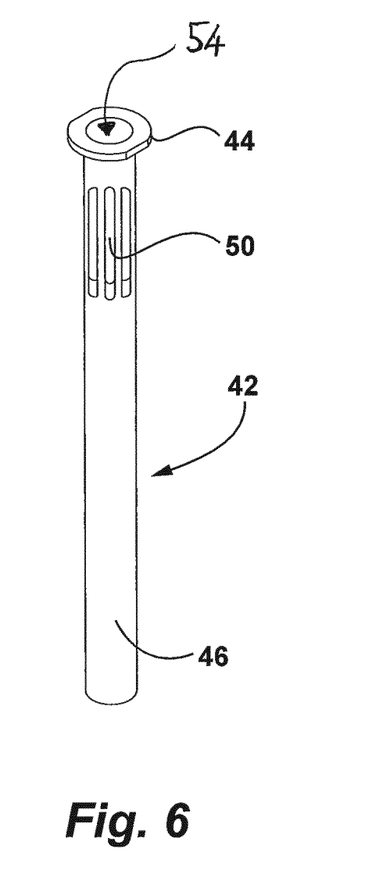
FIG. 6 is a perspective view of a filler tube.

Shown in FIGS. 5 and 6 is an advantageous filler sleeve 42 that is provided at its upper portion, shortly below the flange with a number of sieve openings 50. These are best seen in FIG. 6. The sieve openings are sized to block the passage of catalyst particles but to allow dust and fines to easily pass therethrough. By application of a vacuum to volume 38 via vacuum outlet 18 the loaded particulate material can be subjected to dust and fines removal immediately prior to its entry into the reaction tubes.

As is seen in FIG. 5, the loading tray element 4 is elongate with catalyst loading openings 12 linearly arranged in a single row. This allows for good air flow to the suction outlet 18 whereby dust and fines entering into the volume 38 can be readily removed via the vacuum outlet 18. In a preferred embodiment, not shown, a semi-circular air-flow deflector may be provided in front of the vacuum outlet 18 with its concave side facing the filler sleeve 42 closest the vacuum outlet 18. Such a deflector can advantageously improve airflow within the volume 38 and can prevent application of an excessive suction to the closest filler sleeve while ensuring adequate airflow at deeper positions within the volume 38.

It will be clear to those skilled in the art that in the event that filler sleeves are not required for achieving outage in the catalyst loading process then tubular elements with sidewall sieve openings could be provided in the volume 38 as alternative sieve components. The tubular elements would form a channel from each loading opening 12 to its corresponding reaction tube opening 24. In this manner, dust and fines can be effectively removed during loading of the catalyst without filler sleeves.

The captured dust and fines material is preferably collected and recycled to form fresh catalyst since it typically contains valuable catalytic metals.

It is also considered to be advantageous to include a dust sensor probe in the vacuum outlet stream. Such a probe can measure the concentration of dust removed by the vacuum and provide information indicating the levels of dust content in a batch of catalyst and the total quantity of dust recovered.

Returning to FIG. 4 the catalyst loading element 4 is provided with a vibrator 32 in vibrational contact with loading template 14. The vibrator 32 causes the loading template 14 to vibrate so that particulate catalyst present on the catalyst loading template 14 is agitated and falls into the catalyst loading openings 12.

As can be seen in FIGS. 2A and 2B each of the catalyst loading modules is provided with such a vibrator 32. Upon construction of a larger catalyst loading tray 2 from a plurality of modules 4, the vibrators 32 on each module make it possible to effect vibration across the extended catalyst loading template 14. This advantageously aids in avoiding the need for manual or automated sweeping of catalyst particles into the catalyst loading openings 12.

Referring to FIG. 5, the catalyst loading template 14 is raised up on resilient supports 34, preferably constructed from rubber or a similar resilient material, which act to insulate the template from the rest of the element 4 and the catalytic reactor.

In an exemplary method of loading the multitube catalytic reactor 10 with particulate (granular) catalytic material, the catalytic material is charged to each of the reactor tubes 9 using the illustrated loading tray 2. The loading tray elements 4 are passed in unjoined form into the work space above the tubesheet 8 via a manhole or other opening. A first one of the loading elements 4 is positioned atop the tubesheet 8 with its loading holes 12 aligned with tube sheet openings 24. A further loading tray element 4 is then slid into engagement with the already laid loading tray 4 by use of the T-slot mechanism 28. This laying of further loading tray elements 4 is continued in order to make up an extended array of loading holes 12 in an extended planar template 14. Different lengths and forms of loading tray elements 4 are added into the array to obtain a desired coverage form and size matching the tubesheet and reactor, e.g. to match the outer curve and to build around cooling tubes.

Peripheral sidewall elements 26 are slotted into the outer 1-slots 28 of the built array to form a closed off loading tray for the catalyst pellets when they are poured on.

Filler sleeves 40, 42 are inserted into the loading openings 12 whereby their upper flanges 44 come to rest within the template 14 and the loading openings 12 are restricted in size to the loading orifice 54 of the filler sleeve 40, 42. The filler 40, 42 sleeves can be added prior to during or after the assembly of the extended template array. Usually a filler sleeve, 40, 42 will be inserted into every one of the loading openings 12, however, on occasion it may be that catalyst is not to be filled into one or more of the openings, in which case a plug can be inserted to block the selected loading opening(s) 12.

A vacuum line is attached to each of the vacuum outlets 18 for application of dust removing suction to each of the volumes between the loading tray templates 14 and the tubesheet 8.

Catalyst material is poured onto the assembled loading tray 2 while at the same time the vibrators 32 cause vibration of the templates 14. The catalyst particles are agitated or jostled and spill into the loading orifices 54, passing through the filler sleeves 40, 42 and into the reaction tubes. As the catalyst material passes through the upper part of the filler sleeves 40, 42 the suction applied via vacuum outlet 18 removes dust and fragments through the sieve openings 50.

The filler sleeves 40, 42, are filled to their upper level and then excess catalyst material is removed from the loading tray 2. This can conveniently be done by removing at least a part of the peripheral sidewall and sweeping the excess catalyst over the open edge of the loading tray into a receptacle.

The loading tray elements 4 are then lifted up from the tubesheet 8 raising the filler sleeves 40, 42 at the same time. The catalyst in the filler sleeves 40, 42 falls into the reactor tubes filling the tubes to the desired level with an outage. Vibration can be continued during and after lifting to ensure that the catalyst particles fall out of the filler sleeves.

The loading tray elements 4 can be lifted one at a time or in groups. Since manual lifting will often be implemented, the loading tray elements are preferably lifted one by one.

It is possible to cover a whole tubesheet 8 with an assembled loading tray 2. However, for efficient filling practices, it is often better to assemble a loading tray 2 atop only a section of the tubesheet 2 since this allows other sections of the tubesheet to be handled by another worker resulting in a speedier filling.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A loading tray for loading particulate material into an array of substantially vertical tubes; wherein the loading tray comprises a plurality of loading tray elements, each loading tray element comprising at least one loading opening and at least some of the loading tray elements comprising at least two loading openings, the loading tray elements being fitted together to form an array of the loading openings.

2. A loading tray according to claim 1 wherein each loading tray element is provided with a mechanical coupling for releasable fitting to an adjacent loading tray element.

3. A loading tray according to claim 1 wherein each loading tray element is provided with a mechanical fastener and the loading tray elements are mechanically releasably fastened into an array.

4. A loading tray according to claim 1 wherein the loading tray elements are releasably fastenable into an array by way of T-slot linkages, L-slot linkages, dove tail linkages, interlocking contours or magnetic linkages.

5. A loading tray according to claim 1 wherein one or more of the loading tray modules comprises at least 3 loading openings.

6. A loading tray according to claim 1 wherein the loading tray, elements have less than 40 loading openings.

7. A loading tray according to claim 1 provided with one or more upstanding walls at or beyond a periphery of the array of loading openings.

8. A loading tray according to claim 1 provided with one or more releasably attached sidewalls.

9. A loading tray according to claim 1 wherein at least one of the loading openings has a form suited to receive and support a filler sleeve.

10. A loading tray according to claim 9 wherein at least one of the loading openings comprises a peripheral seat for receiving and supporting an upper flange of a filler sleeve, wherein the seal and flange have dimensions such that when seated the flange lies flush in the loading opening.

11. A loading tray according to claim 1 wherein filler sleeves are provided in the loading openings.

12. A loading tray according to claim 11 wherein the filler sleeves are vertically supported in the loading openings, wherein each filler sleeve comprises an upper flange that engages a periphery of a loading opening in which it is located.

13. A loading tray according to claim 1 wherein at least one vibrating motor is provided for vibrating one or more of the loading elements.

14. A loading tray according to claim 1 wherein one or more of the loading tray elements is provided with a suction outlet for removal of dust.

15. A loading tray according to claim 14 wherein filler sleeves are disposed in catalyst loading openings, the filler sleeves having in their upper region sieve openings that during use allow passage of dust but not passage of pellets.

16. A loading tray according to claim 15 wherein the tray elements with suction outlet comprise a substantially closed volume open only to the filler sleeve sieve openings and the suction outlet.

17. A method of filling an array of substantially vertical tubes with a particulate material, comprising the steps of:
  a) disposing a loading tray for loading particulate material into an array of substantially vertical tubes; wherein the loading tray comprises a plurality of loading tray elements, each loading tray element comprising at least one loading opening and at least some of the loading tray elements comprising at least two loading openings, the loading tray elements being fitted together to form an array of the loading openings, above the array of tubes so that the loading openings align with openings of the tubes;
  b) supplying the particulate material to the array of loading openings such that the particulate material passes through the loading openings and the tube openings; and
  c) removing the loading tray from the array of tubes.

18. A method according to claim 17 wherein step a) comprises at least partial in situ assembly of the loading tray from loading tray elements.

19. A method according to claim 17 wherein the loading tray is vibrated for at least a part of step b).

20. A method of filling a catalytic reactor according to claim 19 wherein the particulate material is a particulate cataslyst.

21. The method according to claim 19 wherein the loading tray is also vibrated during at least part of step c).

22. A method according to claim 17 wherein suction to remove dust is applied for at least a part of step b).

23. A kit of parts comprising:
  a) a plurality of catalyst loading tray elements, each loading tray element comprising at least one loading opening and at least some of the loading tray elements comprising at least two loading openings, the loading tray elements being fitted together to form an array of the loading openings;
  b) a plurality of catalyst filler sleeves disposable within the catalyst loading openings of the catalyst loading tray modules.

24. A kit of parts according to claim 23 wherein the filler sleeves are provided with screen openings for retaining catalyst particles but for allowing passage of dust.

25. The kit of parts according to claim 23, further comprising a plurality of modular end walls releasably attachable to the catalyst loading tray modules.

* * * * *